US011478875B2

(12) United States Patent
Bunz et al.

(10) Patent No.: US 11,478,875 B2
(45) Date of Patent: Oct. 25, 2022

(54) PROCESSING MACHINE WITH NOZZLE CHANGER AND A PROTECTIVE ENCLOSURE

(71) Applicants: TRUMPF Schweiz AG, Gruesch (CH); TRUMPF Werkzeugmaschinen GmbH + Co. KG, Ditzingen (DE)

(72) Inventors: Andreas Bunz, Leinfelden-Echterdingen (DE); Philipp Nieding, Kornwestheim (DE); Julian Rudow, Zug (CH); Simon Schnyder, Rapperswil (CH); Andreas Buehler, Zurich (CH)

(73) Assignees: TRUMPF Werkzeugmaschinen GmbH + Co. KG, Ditzingen (DE); TRUMPF Schweiz AG, Gruesch (CH)

( * ) Notice: Subject to any disclaimer, the term of this patent is extended or adjusted under 35 U.S.C. 154(b) by 470 days.

(21) Appl. No.: 16/205,951

(22) Filed: Nov. 30, 2018

(65) Prior Publication Data
US 2019/0099834 A1 Apr. 4, 2019

Related U.S. Application Data

(63) Continuation of application No. PCT/EP2017/062439, filed on May 23, 2017.

(30) Foreign Application Priority Data

May 30, 2016 (DE) .................. 102016209285.5

(51) Int. Cl.
B23K 26/12 (2014.01)
B23K 26/14 (2014.01)
(Continued)

(52) U.S. Cl.
CPC ........ B23K 26/127 (2013.01); B23K 26/1482 (2013.01); B23K 26/706 (2015.10);
(Continued)

(58) Field of Classification Search
CPC ........... Y10T 483/00–19; B23Q 3/155–15793; B23Q 3/15506; B23K 26/127;
(Continued)

(56) References Cited

U.S. PATENT DOCUMENTS 5,376,062 A 12/1994 Zeichner
7,129,441 B2 * 10/2006 Yamazaki .............. B23K 26/10
219/121.78
(Continued)

FOREIGN PATENT DOCUMENTS

CN 101491862 A 7/2009
CN 104703751 A 6/2015
(Continued)

OTHER PUBLICATIONS

Machine English Translation of Specification for JPS62254993A (Year: 1987).*
(Continued)

Primary Examiner — Sang Y Paik
Assistant Examiner — Erwin J Wunderlich
(74) Attorney, Agent, or Firm — Fish & Richardson P.C.

(57) ABSTRACT

A processing machine for processing a workpiece with a processing beam includes a nozzle changer and a protective enclosure. The nozzle change is for mounting nozzles on or demounting nozzles from a processing head of the processing machine. The nozzle changer has multiple nozzle holders for holding nozzles. The protective enclosure is configured to close off a working space for the processing of the workpiece with the processing beam from a working space surrounding area. The nozzle changer is movable between a
(Continued)

nozzle changing position within the protective enclosure and a setup position outside the protective enclosure.

9 Claims, 5 Drawing Sheets

(51) Int. Cl.
*B23K 26/70* (2014.01)
*B23K 37/00* (2006.01)
*B29C 64/20* (2017.01)
*B23Q 3/155* (2006.01)
*F16P 1/06* (2006.01)

(52) U.S. Cl.
CPC ........ *B23K 37/006* (2013.01); *B23Q 3/15506* (2013.01); *B29C 64/20* (2017.08); *B23Q 3/155* (2013.01); *F16P 1/06* (2013.01)

(58) Field of Classification Search
CPC .......................... B23K 26/706; B23K 26/1482; B23K 37/006; B23K 26/0093; B29C 64/20; F16P 1/06
USPC ...................................................... 219/121.67
See application file for complete search history.

(56) References Cited

U.S. PATENT DOCUMENTS

| | | | |
|---|---|---|---|
| 8,366,593 B2 | 2/2013 | Smauder | |
| 8,933,365 B2 * | 1/2015 | Tweitmann | ............ B23K 26/06 219/121.6 |
| 10,245,696 B2 | 4/2019 | Doettling et al. | |
| 2005/0263510 A1 | 12/2005 | Yamazaki et al. | |
| 2005/0266974 A1 * | 12/2005 | Yamazaki | .......... B23K 26/1482 483/16 |
| 2007/0000888 A1 | 1/2007 | Yamazaki et al. | |
| 2007/0045258 A1 * | 3/2007 | Yamazaki | .......... B23K 26/1482 219/121.84 |
| 2008/0053976 A1 | 3/2008 | Yamazaki et al. | |
| 2017/0001258 A1 | 1/2017 | Hildebrand et al. | |

FOREIGN PATENT DOCUMENTS

| | | | | |
|---|---|---|---|---|
| DE | 195 46 677 | | 6/1997 | |
| DE | 10 2013 224649 | | 6/2015 | |
| EP | 1 602439 | | 12/2005 | |
| EP | 2 589 458 | | 8/2014 | |
| JP | S62254993 A | * | 6/1987 | ................ F16P 3/12 |
| JP | H03-58362 | | 3/1991 | |
| JP | H04 309 487 | | 11/1992 | |
| JP | H05-2852 | | 1/1993 | |
| JP | 2003-200329 | | 7/2003 | |
| JP | 2004-209540 | | 7/2004 | |
| JP | 2006-312182 | | 11/2006 | |
| JP | 2009-166126 | | 7/2009 | |
| JP | 2013-226631 | | 11/2013 | |
| JP | 2014 172 046 | | 9/2014 | |
| WO | WO 97/22431 | | 6/1997 | |
| WO | WO-2013037927 A1 | * | 3/2013 | ................ F16P 3/12 |
| WO | WO-2014044594 A1 | * | 3/2014 | ......... B23Q 11/0891 |

OTHER PUBLICATIONS

Machine English Translation of Specification for WO-2013037927-A1 (Year: 2013).*
Machine English Translation of Specification for WO-2014044594-A1 (Year: 2014).*
Sliney, David and Myron Wolbarsht, "Safety with Lasers and Other Optical Sources: A Comprehensive Handbook," Springer Science + Business Media, LLC, p. 8 (Year: 1980).*
International Search Report and Written Opinion in International Application No. PCT/EP2017/062439, dated Sep. 21, 2017, 21 pages (with English translation).
JP Office Action in Japanese Appln. No. 2018-562636, dated Feb. 3, 2020, 17 pages (with English translation).
CN Office Action in Chinese Appln. No. 201780033931.3, dated Mar. 23, 2020, 18 pages (with English translation).

* cited by examiner

PROCESSING MACHINE WITH NOZZLE CHANGER AND A PROTECTIVE ENCLOSURE

CROSS-REFERENCE TO RELATED APPLICATIONS

This application is a continuation of and claims priority under 35 U.S.C. § 120 from PCT Application No. PCT/EP2017/062439 filed on May 23, 2017, which claims priority from German Application No. DE 10 2016 209 285.5, filed on May 30, 2016. The entire contents of each of these priority applications are incorporated herein by reference.

TECHNICAL FIELD

The present invention relates to a processing machine, in particular a laser processing machine, for processing a workpiece by means of a processing beam, in particular by means of a laser beam. The processing beam may be a laser beam, but the use of some other kind of processing beam, for example in the form of a plasma arc, is also possible.

BACKGROUND

A nozzle changer for a laser processing machine is disclosed for example by EP 2 589 458 B1. The nozzle changer has a plurality of nozzle holders, which are arranged in a common storage device. A respective nozzle holder serves for the mounting and/or demounting of a nozzle to/from the processing head of the laser processing machine.

Laser nozzles that are provided on a laser processing head of a laser processing apparatus for carrying out a processing process or burner nozzles that are provided on a burner head of a plasma processing machine can be contaminated or damaged due to collisions with parts of workpieces, spatter and soiling from the processing process. Such nozzles are consequently wearing parts, which should be regularly changed for reasons of maintaining process reliability. A change of the nozzles is also required if different types of nozzle are to be used for different cutting processes.

DE 195 46 677 A1 discloses a flame cutting machine which has a tool part receiving unit provided with a cover and comprising a number of tool part receiving stations, which is designed in such a way that it is suitable for the vertically displaceable, insertable and removable storage of a group of exchangeable tool parts, which may be nozzles. The tool part receiving unit may have a drawer-like component, which can be moved out of the cover in a controlled manner by means of a linear adjusting device, in order to exchange a respective tool part on a tool, for example on a burner head.

EP 1 602 439 B1 discloses a nozzle magazine within a protective enclosure of a laser processing machine, which is arranged at a position for automatic tool changing, a dust-tight cover covering the nozzle exchanging magazine from above and only opening when a nozzle of a laser processing tool is being changed.

JP 2014 172 046 A describes a laser processing machine in which a nozzle holding device is provided at one end of a carriage, which is designed for clamping a free end of a workpiece to be processed. The nozzle holding device has an openable and closable cover, which covers the upper side of a plurality of nozzles accommodated in the nozzle holding device.

US 2008053976 A1 discloses a cutting head magazine which is arranged outside a protective enclosure of a laser processing machine and in which a plurality of cutting heads are mounted along a chain. A cutting head changing unit takes over a cutting head from a transfer position of the cutting head magazine and exchanges the cutting head fastened to a processing head for the cutting head removed from the cutting head magazine.

SUMMARY

The invention features a processing machine of the type mentioned at the beginning which has a protective enclosure for closing off a working space for processing the workpiece with the processing beam from a working space surrounding area, the nozzle changer being movable between a nozzle changing position within the protective enclosure and a setup position outside the protective enclosure.

The protective enclosure serves for closing off or shielding the working space from the surrounding space and ensures for example that during the processing of the workpiece within the working space by means of the processing beam no high-energy radiation gets into the surrounding space, or only so little radiation that the prescribed radiation limit values are maintained, so that an operator can safely move around outside the protective enclosure during the processing.

The movement of the nozzle changer to the setup position outside the protective enclosure, which is typically accessible for an operator, allows a manual pre-setup, or a pre-setup that is automated for example by means of a robot, of the nozzle changer, to be more precise the manual or automated loading of nozzle holders of the nozzle changer with nozzles that are of a suitable type for the subsequent processing of a workpiece, and/or the exchange of nozzles damaged during processing for new nozzles, to take place while the processing of a workpiece or other processes, for example the loading and unloading of workpieces, is/are taking place in the machine. The setup can therefore take place at the same time as all of the operating states of the processing machine in which no nozzle change takes place.

For the nozzle change, which is typically performed between two successive processing operations, the nozzle changer is moved to the nozzle changing position within the protective enclosure. For the movement of the nozzle changer between the nozzle changing position and the setup position, the protective enclosure has an opening. The nozzle changing position is typically chosen such that the processing head can be moved to the nozzle changing position with the aid of its movement axes, in order to carry out a nozzle change at a respective nozzle holder. The nozzle changing position is therefore generally located alongside a processing area for the processing of the workpiece. The nozzle change may for example be performed in the way described in the initially cited EP 2 589 458 B1, i.e. the processing head approaches the nozzle holders from above for the nozzle change. The nozzle changer may for example be designed as described in EP 2 589 458 B1, which is incorporated by reference into the content of this application.

In one embodiment, the nozzle changer is movable in the protective enclosure between the nozzle changing position and a rest position, from which the nozzle changer can be moved into the setup position outside the protective enclosure. The nozzle changer is typically moved from the rest position into the nozzle changing position and vice versa by an automatically controlled movement, i.e. by means of a drive. For this purpose, the nozzle changer may for example be linearly displaced or possibly pivoted along a lever arm.

At the nozzle changing position, the nozzle changer is typically open in the upward direction, in order to be able to perform the nozzle change with the aid of the processing head. With the aid of the machine axes, the processing head is made to travel over the nozzle changer arranged at the nozzle changing position, so that a nozzle provided on the processing head can be changed. The rest position is typically further away from the processing area than the nozzle changing position. The nozzle changer can be moved into the rest position, in order to prevent soiling of the nozzle changer during the process process.

In a development, the nozzle changer is manually movable from the rest position into the setup position (and vice versa) (by pulling or pushing). In this case, the nozzle changer can be moved by an operator (or robot) from the rest position into the setup position as and when required. This is only possible when the nozzle changer is arranged in the rest position. Manual access to the nozzle changer by an operator, i.e. the manual movement into the setup position, may be barred by a locking mechanism when the nozzle changer is arranged in the nozzle changing position or when the nozzle changer is being moved between the nozzle changing position and the rest position.

In a development, the processing machine has a (stationary) housing for covering the plurality of nozzle holders of the nozzle changer in the rest position. The housing allows the nozzle changer to be protected from soiling that occurs during the processing of a workpiece. The housing typically has a housing cover, which covers the plurality of nozzle holders on the upper side of the nozzle changer. Preferably, one side wall of the housing is closed by a shielding element connected to the nozzle changer when the nozzle changer is arranged in the rest position in the housing. In a further development, in the rest position and in the setup position the nozzle changer is arranged or accommodated in a first drawer-like component (e.g. a drawer). Preferably, in the nozzle changing position the nozzle changer is accommodated within another, second drawer-like component (e.g. a drawer), the second drawer-like component being accommodated in the first drawer-like component in the rest position and in particular being movable into the setup position together with the first drawer-like component, or vice versa. In the setup position, the first drawer-like component is in a position in which it is pulled out from the protective enclosure, so that the nozzle changer can be loaded with nozzles by the operator (or a robot). In this case, the nozzle changer is integrated in the (existing) casing or protective enclosure of the processing machine by means of the front face of the first drawer-like component, and it is possible for the nozzle changer to be manually pulled out into the position in which it is pulled out from the protective enclosure (in the manner of a drawer).

When the second drawer-like component is arranged within the first drawer-like component in the rest position, during the movement of the nozzle changer into the setup position a front face of the second drawer-like component that is facing the working space of the processing machine is typically not moved along with it, so that the opening of the housing that is facing the working space is closed by this front face. During the movement of the nozzle changer from the rest position into the nozzle changing position, the first drawer-like component is typically not moved along with it, so that the opening in the protective enclosure remains closed by the front face of the first drawer-like component that is facing the working space surrounding area. In this way, the radiation protection by the protective enclosure or the closed housing is always ensured. It goes without saying that the arrangement of the two drawer-like components within one another may also be the opposite way around.

In a further embodiment, the processing machine additionally comprises a casing component (e.g. a door) fastened to the side of the protective enclosure that is facing the working space surrounding area and/or a cover, which is movable between a first position and a second position, wherein in the first position the casing component and/or the cover separates the setup position from the working space surrounding area and in the second position the setup position is accessible from the working space surrounding area.

The casing component may for example be fastened to the protective housing by way of a joint and be pivoted manually between the first, closed position, in which the casing component separates the setup position, to be more specific a space surrounded or closed by the casing component, which for example forms an interior space of a cupboard-like component of the protective enclosure, from the working space surrounding area, and the second, open position, in which the setup position is accessible for an operator, in the manner of a cupboard door. In this case, the nozzle changer or the drawer-like component with the nozzle changer accommodated therein is accommodated in the setup position in the cupboard-like machine part of the protective enclosure, for example a box located there. The casing component typically does not act itself as a shielding for the stray radiation from the working area and may for example have one or more viewing windows. Instead of a pivotable casing component, a displaceable casing component in the manner of a sliding door may for example also be used.

In the setup position, the nozzle changer is accommodated within the casing component (in the "cupboard" or cupboard-like door) on the side of the protective enclosure that is facing the surrounding space, so that the processing process has no influence on the nozzle changer. The nozzle changer can be loaded with nozzles during the main time, i.e. during the processing operation, for example during the laser cutting, by opening the cupboard door. For the nozzle change, the nozzle to changer in this case moves typically in an automatically controlled manner through the protective enclosure in an inward direction into the working space.

As an alternative or in addition to the casing component, the processing machine may have a cover, which is likewise movable between a first position and a second position, in order to separate the setup position from the working space surrounding area in the closed position or connect it to the working space surrounding area in the open position. If the processing machine has the casing component described further above, the cover is typically arranged in the space enclosed by the casing component. The cover in this case typically serves the purpose of covering an opening in the cupboard-like machine part, for example an opening in the box provided there, through which the nozzle holders arranged on the upper side of the nozzle changer can be accessed.

In the first, closed position, the cover serves for covering the opening, and consequently for protecting the nozzles arranged in the nozzle changer from soiling. Furthermore, the cover may serve the purpose of preventing an intervention by the user during the traveling movement of the nozzle changer, and as a result for example the pinching of a hand. The cover may cover the main body, on the upper side of which the nozzle holders of the nozzle changer are mounted, in the first position for example from above. The cover may for example be designed in the manner of a slide or a flap, which can be moved in a pivoting movement or in a linear movement from the first position into the second position and vice versa. The cover only has to be manually opened for loading the nozzle changer with the nozzles and can otherwise remain in the closed position.

In a development, the processing machine comprises a sensor device (e.g. a sensor) for detecting the first and/or the second position of the casing component and/or of the cover. The sensor device may for example be formed by a safety switch (contact switch), which is designed for detecting the "closed" state, i.e. for detecting the first, closed position. The sensor device may possibly also be designed to detect the second state or the transition from the first position into the second position, for example if it is designed in the manner of an optical sensor, for example a light barrier, which detects a movement out of the first position.

In a further development, the processing machine, to be more specific a control device of the processing machine, is designed to prevent the (automated) movement of the nozzle changer from the nozzle changing position into the setup position and vice versa when the casing component and/or the cover is in the second (open) position. For this purpose, the control device may be in connection with the sensor device and act on a drive used for the movement of the nozzle changer if leaving of the first position is detected. If, when leaving the first position, the nozzle changer is moved between the setup position and the nozzle changing position, this movement may possibly be stopped. In this way it can be prevented that an operator injures himself when attempting manual access to the nozzle changer, for example because he pinches his fingers between a component of the protective enclosure and the moving nozzle changer.

In a further development, the processing machine has a locking device (e.g. a lock) for locking the casing component and/or the cover in the first, closed position when the nozzle changer is not located in the setup position. The locking device may for example have a mechanical bolt, which locks the casing component and/or the cover in the first position if the nozzle changer is not in the setup position. Only for the case where the nozzle changer is in the setup position is the locking released and the casing component or the cover can be moved into the second position.

In a further embodiment, the processing machine additionally comprises a nozzle magazine for depositing nozzles, which is arranged adjacent to the nozzle changer located in the setup position. The nozzle magazine serves for storing nozzles that are not required for processing a workpiece at the moment, which an operator can access during the pre-setup of the nozzle changer. The nozzle magazine may be aligned obliquely to the horizontal, in order to reduce the probability of dust falling from above into the nozzle holders or into the nozzles deposited in the nozzle magazine. The nozzle magazine may for example be arranged in the cupboard-like machine part of the protective enclosure in a common insert or box behind the casing component or the cupboard door, but it is also possible that the nozzle magazine is arranged either together with the nozzle changer or separately in a drawer-like component that can be pulled out from the protective enclosure.

In a further embodiment, the nozzle changer has at least one shielding element (also referred to as a shield) for preventing laser radiation from exiting the working space into the working space surrounding area or wherein the nozzle changer is releasably connected to the shielding element. As described further above, an opening is provided in the protective enclosure, in order to move the nozzle changer from the nozzle changing position into the setup position and vice versa. The nozzle changer therefore represents a component part of the radiation protection and safety concept of the processing machine, because it must be ensured that, with the nozzle changer arranged in the setup position when the drawer-like component or cupboard-like machine part is open, high levels of radiation cannot escape from the working space of the processing machine. If a rest position is provided for the nozzle changer, it must also be ensured that, with the nozzle changer arranged in the rest position, the maximum radiation that can exit from the working space does not exceed the permissible limit values.

This can be ensured for example by a shielding element, for example in the manner of a shielding plate or radiation protection plate, which is provided on an end face of the nozzle changer transversely to the direction of movement of the nozzle changer, along which the nozzle changer is linearly moved. The (lateral) shielding element on the nozzle changer is of such a size that stray radiation from the location of the process cannot leave the working space closed off by the protective enclosure in an impermissible way. For this purpose, for example the beam path of the stray radiation between the location of the process and the opening in the protective enclosure may be covered entirely or for the most part by the shielding element or be interrupted, to be precise in each position of the nozzle changer at which the protective enclosure is open.

If a housing is arranged at the rest position of the nozzle changer, on the one hand the nozzle changer can be moved in an automated manner out of the housing or the rest position into the nozzle changing position, and consequently into the working space, and on the other hand the nozzle changer can be pulled manually out of the housing outwardly into the working space surrounding area. The shielding element of the nozzle changer is dimensioned such that in the rest position and in the setup position the housing is closed by the shielding element of the nozzle changer at least to the extent that radiation protection is ensured. During the movement of the nozzle changer from the rest position into the setup position, in this case the shielding element can be separated from the nozzle changer, in order to close the opening in the housing. During the movement of the nozzle changer from the rest position into the nozzle changing position, the shielding element is typically coupled in terms of movement with the nozzle changer, i.e. the shielding element is moved together with the nozzle changer. The shielding element may in particular be a front face or front side of the second drawer-like component described further above.

In a further embodiment, the processing machine additionally comprises a drive for moving the nozzle changer out of the nozzle changing position into the rest position or out of the nozzle changing position into the setup position, and vice versa. The movement of the nozzle changer between the respective positions is typically a linear movement. For the activation of the drive, the control device described further above may be used. At least one pneumatic cylinder may serve for example as the drive for the automatically controlled movement of the nozzle changer. This is typically only movable in a controlled manner between two end positions, which correspond to a fixed nozzle changing position and a fixed rest position or a fixed nozzle changing position and a fixed setup position. Alternatively, a numerically controlled axis (NC axis) or a linear drive may be used for positioning the nozzle changer. In this case, any desired intermediate positions can be achieved between the nozzle changing position and the rest position or the transfer position, so that possibly the processing head does not have to approach each of the nozzle holders of the nozzle changer individually, because the location of the nozzle changing position in the working space can be suitably adapted by the controlled movement of the nozzle changer.

In a further embodiment, the processing machine additionally comprises a brush element (also referred to as a brush), fixedly arranged in the working space or on the or on a shielding element, for cleaning a nozzle mounted on the processing head when the nozzle changer is arranged in the rest position or in the setup position. With the aid of the fixedly arranged brush element, nozzle cleaning is always possible without an active traveling movement of the nozzle changer, whereby productivity is increased. When brushing soiled nozzles, adhering slag and dust flake off, spreading out in all directions. In order to protect the nozzle changer from soiling, it is typically moved from the nozzle changing position into the setup position or into the rest position before the cleaning of a nozzle with the aid of the brush element. If a housing is arranged in the rest position, the brush element may also be provided on the nozzle changer, or possibly on a shielding element releasably connected to the nozzle changer, and be moved along with it, because it is protected from soiling during the cleaning by the housing. The fact that the nozzle changer is not arranged in the direct vicinity of the brush element or is arranged in the housing during the brushing means that it is protected together with the mechanism needed for the movement. This is favorable in particular for nozzle inspection components that are sensitive to dirt and also for the individual nozzle holders. Also a calibrating plate that is possibly present and is provided on the nozzle changer remains clean in this way and can have a long cleaning or servicing interval.

In a further embodiment, the processing machine has a rotary drive for producing a rotary movement of at least one nozzle holder for mounting and/or demounting a nozzle accommodated in the nozzle holder on the processing head in the nozzle changing position of the nozzle changer. As described in the initially cited EP 2 589 458 B1, the nozzles can be screwed onto and unscrewed from the processing head with the aid of a turning movement. The drive may for example be designed as a motor, which is coupled by way of a toothed belt or by way of gearwheels with a toothed disk of the respective nozzle holder. For nozzles that are fastened to the processing head by way of a plug-in connection, it is possible to dispense with a (rotary) drive.

When fitting in the processing machine, the nozzle changer may be pre-aligned. When installing in the processing machine, straight pins and machined surfaces ensure the correct position without an additional alignment or adjustment being required.

Further advantages of the invention are provided by the description and the drawing. Similarly, the features mentioned above and features still to be set out can each be used on their own or together in any desired combinations. The embodiments shown and described should not be understood as an exhaustive list, but rather as being of an exemplary character for the description of the invention.

In the following description of the drawings, identical reference signs are used for components that are the same or functionally the same.

DETAILED DESCRIPTION

Figure 1:
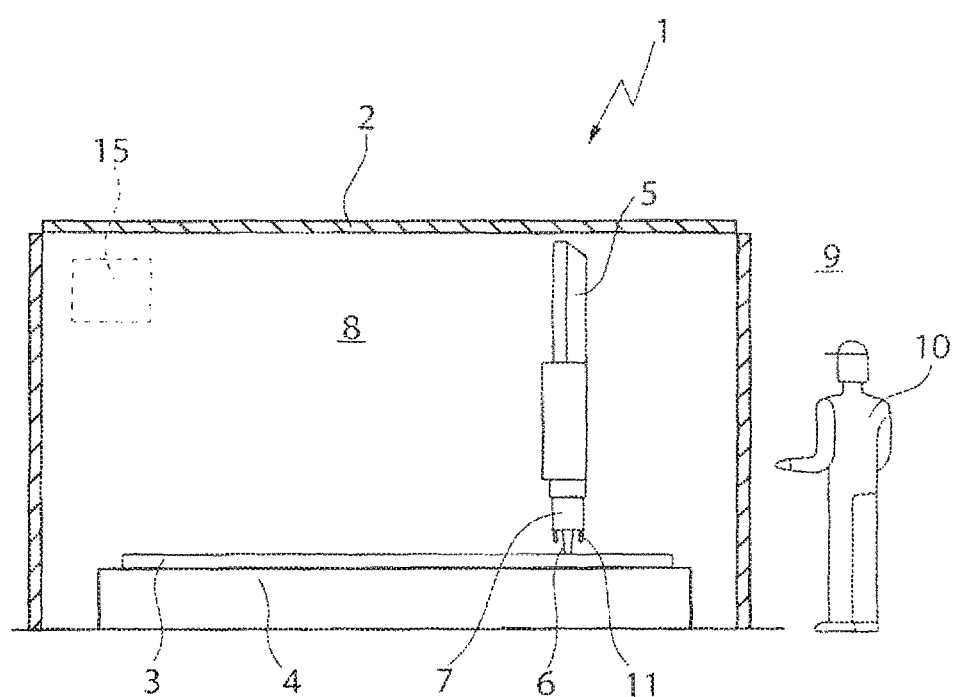
FIG. 1 shows a schematic representation of an exemplary embodiment of a laser processing machine with a protective enclosure in the manner of a laser protection cabin.

FIG. 1 shows schematically and in a simplified manner a structure of a processing machine that is given by way of example, in the form of a laser processing machine 1, which has a protective enclosure 2 in the form of a laser protection cabin. The laser processing machine 1 serves for the laser processing, for example for the laser cutting, of a workpiece 3, which is mounted on a workpiece support 4. The laser processing machine 1 comprises a movement device 5 for moving a laser processing head 7, which directs a laser beam 6 onto the workpiece 3 for the cutting processing. The protective enclosure 2 closes off a working space 8, formed within the protective enclosure 2, from a working space surrounding area 9, which is located outside the protective enclosure 2. The protective enclosure 2 has laser-resistant walls, in order to prevent stray radiation that occurs during the processing of the workpiece 3 with the laser beam 6 from getting into the working space surrounding area 9. Shielding of the working space surrounding area 9 is required for work safety reasons, in order to prevent an operator 10 from being injured by the stray radiation that occurs during the processing.

For the processing of the workpiece 3 with the laser beam 6, the laser processing head 7 has a nozzle 11, through which a stream of cutting gas flows onto the workpiece 3. The nozzle 11 is a wearing part, which may be damaged for example by slag during the processing of the workpiece 3, so that the nozzle 11 may have to be exchanged for a new nozzle 11. Also, depending on the workpiece to be cut or on the respective cutting process, different types of nozzles are required.

Figure 2A:
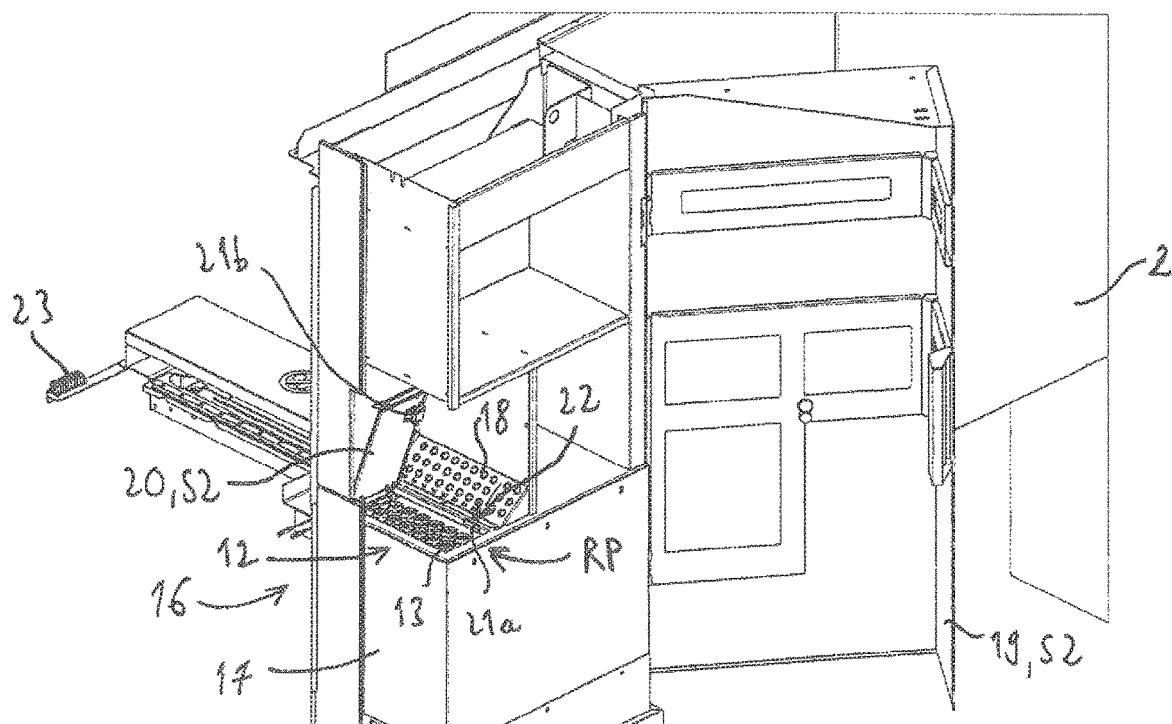
FIGS. 2a-b show representations of a nozzle changer at a nozzle changing position in a working space within the protective enclosure from FIG. 1 and in a setup position outside the protective enclosure.
Figure 2B:
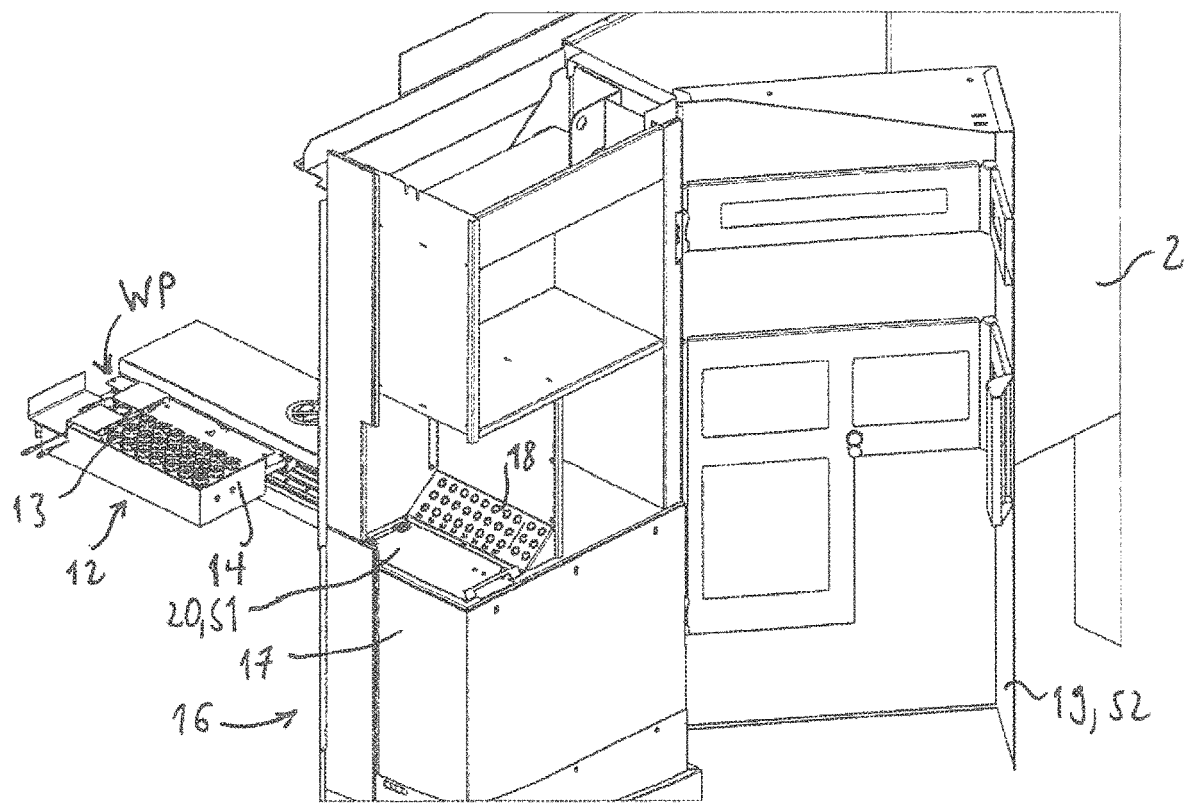

FIGS. 2a-b respectively show a detail of the protective enclosure 2 with a nozzle changer 12, which serves for mounting and demounting nozzles 11 to and from the processing head 7. The nozzle changer 12 has a plurality of nozzle holders 13, in each of which one or possibly a number of nozzles 11 can be deposited, as is described in the initially cited EP 2 589 458 B1. The nozzle holders 13 are arranged in a main body 14 or a storage device of the nozzle changer 12 and are accessible from the upper side of the main body 14 for the processing head 7.

FIG. 2b shows the nozzle changer 12 in a nozzle changing position WP within the protective enclosure 2 and FIG. 2a shows it in a setup position RP outside the protective enclosure 2. For controlling the movement of the nozzle changer 12 between the nozzle changing position WP and the setup position RP, the laser processing machine 1 has a control device 15 (cf. FIG. 1). During the movement, in the example shown a linear movement, of the nozzle changer 12 from the nozzle changing position WP into the setup position RP and vice versa, the nozzle changer 12 is moved through an opening in a laser protection wall of the protective enclosure 2.

As can be seen in FIG. 2a, the setup position RP is formed in a cupboard-like machine part 16, which is provided on the protective enclosure 2 on its side that is facing the surrounding space 9. Provided in the cupboard-like machine part 16, which projects beyond the laser protection wall of the protective enclosure 2 in the outward direction, is a box 17, in which the nozzle changer 12 is accommodated in the setup position RP. The nozzle changer 12, to be more specific the upper side of the main body 14 with the nozzle holders 13, is accessible from above in the setup position RP, so that the operator 10 can access the nozzle holders 13 and the nozzles 11 stored there. Also arranged in the cupboard-like machine part 16 is a nozzle magazine 18, which serves for storing nozzles 11, which can be exchanged by the operator 10 for the nozzles 11 of the nozzle changer 12 that are deposited in the nozzle holders 13. The nozzle magazine 18 is arranged adjacent to the setup position RP and is tilted obliquely with respect to the horizontal, in order to prevent dust from falling from above into nozzles 11 stored there.

As can likewise be seen in FIG. 2a, a casing component 19 is provided on the protective enclosure 2, to be more specific on its side facing the working space surrounding area 9, in the manner of a (cupboard) door, which is movable between a second, open position S2, shown in FIGS. 2a-b, in which the cupboard-like machine part 16, and consequently the setup position RP, is accessible from the working space surrounding area 9, and a first, closed position S1 that is not graphically represented, in which the setup position RP is not accessible from the working space surrounding area 9 or for an operator 10 located there.

As can likewise be seen in FIGS. 2a-b, a cover 20 in the manner of a flap is provided in the cupboard-like machine part 16, which is movable between a second position S2, shown in FIG. 2a, in which the setup position RP, to be more specific the nozzle changer 12, is accessible through an opening formed on the upper side of the box 17, and a first position S1, shown in FIG. 2b, in which the opening in the box 17 is covered by the cover 20, so that the setup position RP of the nozzle changer 12 is separated from the working space surrounding area 9 by the cover 20.

As can be seen in FIG. 2b, the laser processing machine 1 has a sensor device in the form of a contact switch 21a, 21b, which consists of a first switch part 21a and a second switch part 21b. The first switch part 21a is provided laterally at the opening in the box 17, the second switch part 21b is provided on the underside of the cover 20. In the closed position S1 of the cover 20 that is shown in FIG. 2a, the two switch parts 21a, 21b lie against one another and create a contact, which is for example mechanical, electrical or inductive, which is detected by the contact switch 21a, 21b and reported to the control device 15. The control device 15 prevents or stops the movement of the nozzle changer 12 from the setup position RP into the nozzle changing position WP and vice versa as soon as the first position S1 of the cover 20 is left, i.e. in particular in the second position S2 of the cover 20 that is shown in FIG. 2a.

In the example shown in FIGS. 2a-b, the laser processing machine 1 has a locking device 22 (i.e. a lock) (cf. FIG. 2a) for locking the cover 20 in the first position S1, which in the example shown is arranged adjacent to the first switch part 21a. The locking device 22 is activated by the control device 15 when the nozzle changer 12 is not in the setup position RP. The locking device 22, which has a mechanical bolt (not shown), for example in the manner of a pin or the like, engages in a corresponding opening in the cover 20, so that the cover 20 cannot be raised by the operator 10 when the locking device 22 has been activated. The locking device 22 can prevent the operator 10 from reaching into the opening formed in the box 17 during the movement of the nozzle changer 12, and thereby possibly injuring himself. Instead of the cover 20 shown in FIGS. 2a-b in the form of a pivotable flap, a slide which is displaceable between the first and second positions S1, S2 may for example be used as the cover 20.

The locking device 22 is not necessarily required, if the movement of the nozzle changer 12 is automatically prevented or stopped when there is a loss of contact of the contact switch 21a, 21b, but it does additionally increase the safety of the machine 1. Alternatively, the locking device 22 may also be of a purely mechanical design and not activated by the control device 15. The locking device 22 may for example be biased by a spring, this biasing being overcome by the force of a drive spindle of the nozzle changer 12 when the nozzle changer 12 is positioned in the setup position RP.

In a way different from that represented in FIGS. 2a-b, in the laser processing machine 1 there may be provided a locking device 22, which arrests the casing component 19 in the first position S1, so that the cupboard-like machine part 16 of the protective enclosure 2 is not accessible for the operator 10 when the nozzle changer 12 is not in the setup position RP. In this case, it may be possible to dispense with the cover 20 shown in FIGS. 2a-b.

In FIG. 2a there can likewise be seen a brush element 23 (brush segment), which serves for the cleaning of a nozzle 11 provided on the laser processing head 7. For the cleaning, the laser processing head 7 with the nozzle 11 is moved over the brush element 23, in order to brush off adhering slag and dust. The brush element 23 is provided adjacent to the nozzle changing position WP and is typically only used for cleaning the nozzle 11 when the nozzle changer 12 is in the setup position RP. In this way, the nozzle changer 12, in particular the nozzle holders 13 and the mechanism of the nozzle changer 12, for example a calibrating plate provided there, can be protected from soiling.

Figure 3:
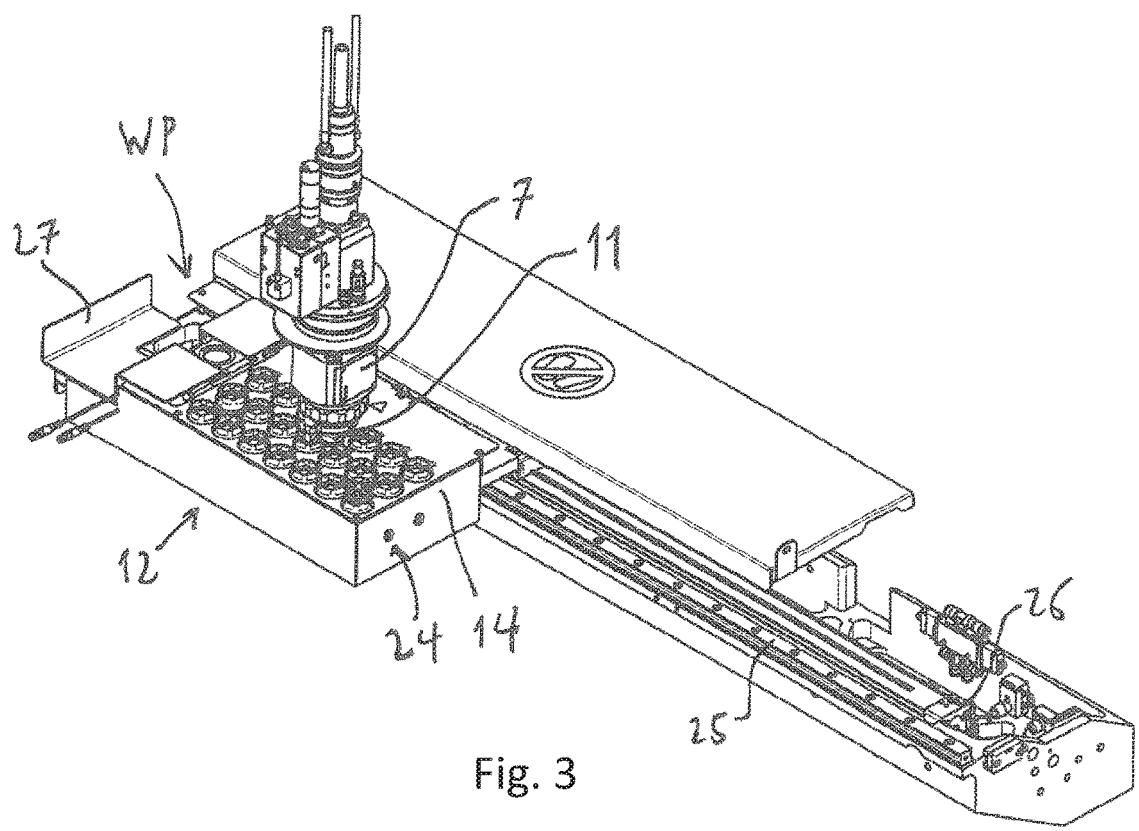
FIG. 3 shows a representation of the nozzle changer from FIGS. 2a-b in the nozzle changing position during the demounting of a nozzle mounted on the processing head.

FIG. 3 shows the nozzle changer 12 in the nozzle changing position WP, in which the laser processing head 7 is positioned over the main body 14 of the nozzle changer 12, in order to mount a nozzle 11 provided on the laser processing head 7 in a nozzle holder 13 or in order to demount the nozzle 11 from the laser processing head 7. In the example shown, the nozzle 11 is provided with a thread and, by means of a rotary drive 24, which is provided in the main body 14 underneath the nozzle holders 13, can be set in a rotational movement about its center axis, for example as is described in more detail in EP 2 589 458 B1.

For moving the nozzle changer 12 from the nozzle changing position WP into the setup position RP and vice versa, the nozzle changer 12 is mounted on a linear guide 25 and can be displaced by means of a drive 26, which in the example shown takes the form of a pneumatic cylinder, along the linear guide 25. Instead of a drive 26 in the form of a pneumatic cylinder, some other drive, for example a controlled linear drive or an NC axis, which allows the nozzle changer 12 to be positioned at any desired point along the linear guide 25, may also serve. In this case, the nozzle changing position along the linear guide 25 may possibly be varied (slightly), in order to position a respectively desired nozzle holder 13 under the laser processing head 7. In this way, the laser processing head 7 possibly only has to approach just one position along the linear guide 25, i.e. it is not necessary to move the processing head 7 to different positions along the linear guide 25 for the nozzle change. Instead of a linear movement, the nozzle changer 12 may possibly also be moved from the nozzle changing position WP into the setup position RP and vice versa in a turning and/or pivoting movement.

As can likewise be seen in FIG. 3, the nozzle changer 12 has a shielding element 27 (or shield) in the form of a shielding plate, which is provided on an end face of the nozzle changer 12 and, during the movement of the nozzle changer 12 from the nozzle changing position WP into the setup position RP, shields the opening formed for this purpose in the protective enclosure 2 from stray radiation from the location of the process, i.e. interrupts the path of the stray radiation to the opening, so that no more than the permissible amount of stray radiation can get from the working space 8 into the working space surrounding area 9.

Figure 4A:
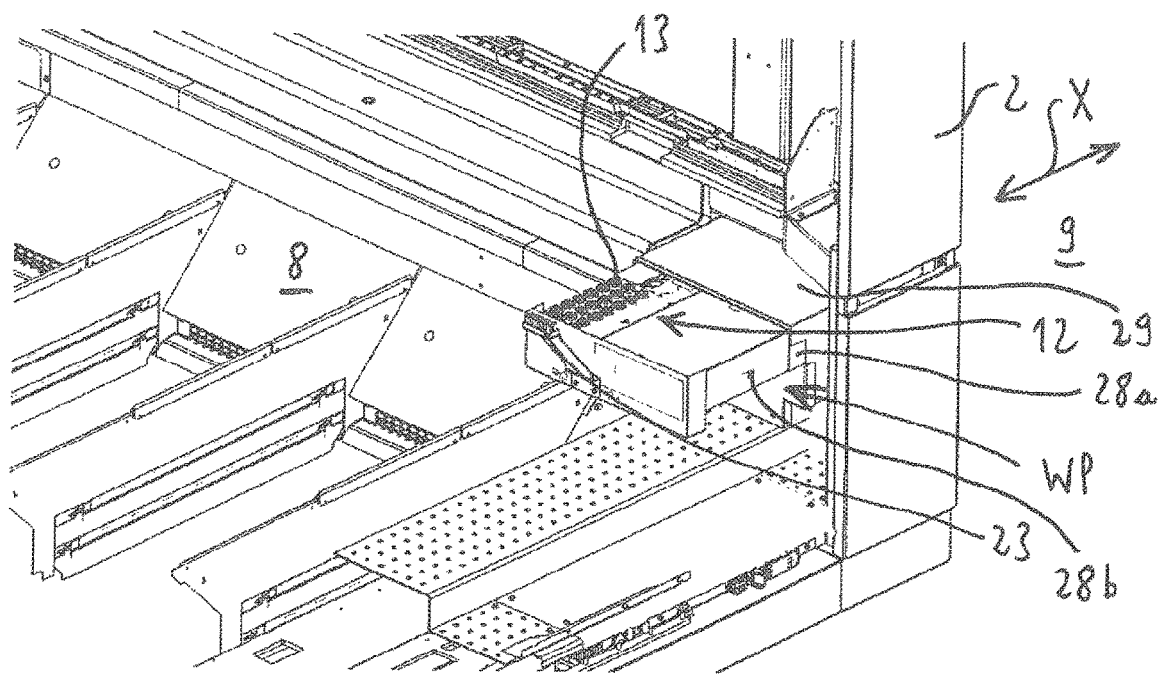
FIGS. 4a-c show representations of a nozzle changer in a nozzle changing position and a rest position within the protective enclosure and also in a setup position outside the protective enclosure.
Figure 4B:
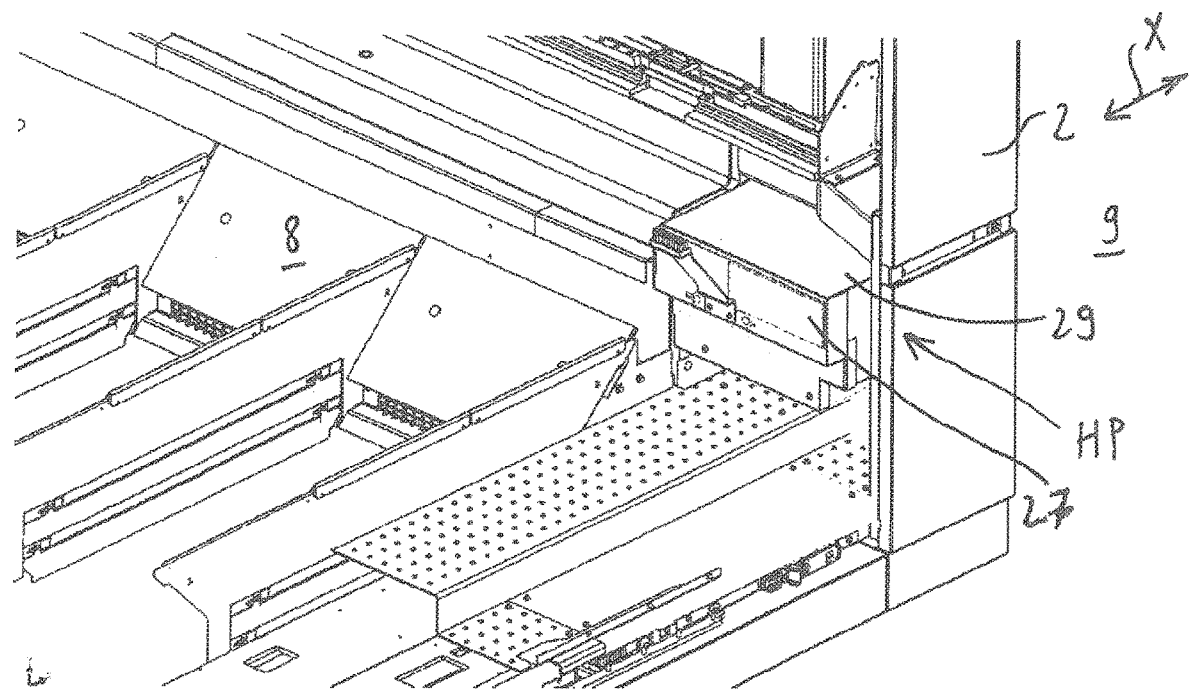
Figure 4C:
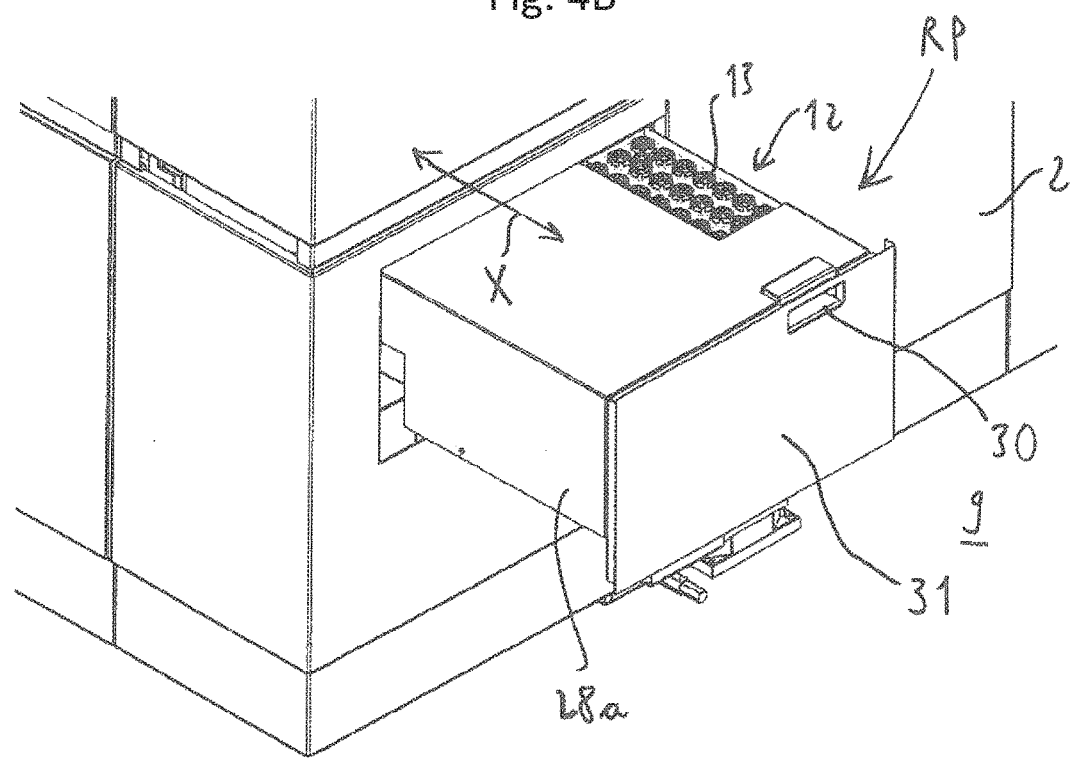

FIGS. 4*a-c* show a detail of a protective enclosure 2 of a laser processing machine 1 which differs from the laser processing machine 1 shown in FIGS. 2*a-b* and FIG. 3. In FIGS. 4*a-b*, a side wall of the protective enclosure 2 is not graphically represented, in order to make the nozzle changer 12 located behind the side wall visible.

The nozzle changer 12 is located in the nozzle changing position WP in FIG. 4*a*, in a rest position HP within the protective enclosure 2 in FIG. 4*b* and in the setup position RP outside the protective enclosure 2 in FIG. 4*c*. As in the example shown in FIGS. 2*a-b*, the nozzle changer 12 can be displaced in an automated manner between the nozzle changing position WP and the rest position HP along a linear axis X by means of a drive not represented in FIGS. 4*a-c*. The nozzle changer 12 is in this case accommodated in a second drawer-like component 28*b*, which is moved together with the nozzle changer 12 along the linear axis X. As can be seen in FIG. 4*b*, the nozzle changer 12 is accommodated in a housing 29 in the rest position HP, which has a housing cover, which covers the nozzle changer 12, to be more specific its upper side, on which the nozzle holders 13 are provided, and protects it in the rest position HP from dust and slag from the working space 8. The nozzle changer 12 or the second drawer-like component 28*b* (or drawer 28*b*) has on its end face a releasable front face, which can be connected to the nozzle changer 12 and can be made to travel together with the second drawer-like component 28*b* along the linear axis X, and which serves as a shielding element 27 (shield) and, when the nozzle changer 12 is arranged both in the rest position HP and in the setup position RP, closes the housing 29 to such an extent that radiation protection is ensured and impermissible levels of stray radiation do not get into the working space surrounding area 9. In the rest position HP, the second drawer-like component 28*b* is accommodated within the housing 29 in a first drawer-like component 28*a* (or drawer 28*a*), which can be pulled out from the protective enclosure 2 into the setup position RP. The shielding element 27 is thereby decoupled from the second drawer-like component 28*b* and remains in its position closing the housing 29.

As can be seen in FIG. 4*c*, the nozzle changer 12 mounted in the first drawer-like component 28*a* in the setup position RP is in a position in which it has been pulled out from the protective enclosure 2, so that it can be loaded with nozzles 11 by the operator 10 in the working space surrounding area 9. The nozzle changer 12 can be moved by the operator 10 manually out of the rest position HP into the setup position RP and vice versa. In order to allow this, a recessed grip 30 for the user 10 is provided in the first drawer-like component 28*a*, to be more specific on a front face 31 of the drawer-like component 28*a*, which in the rest position RP and the nozzle changing position WP forms a part of the outer wall of the protective enclosure 2. Pulling out of the drawer-like component 28*a* from the protective enclosure 2 is only possible when the nozzle changer 12 is arranged in the first drawer-like component 28*a*, which, in the same way as described for FIGS. 2*a-b*, can be ensured with the aid of a contact switch and/or a locking mechanism.

As can likewise be seen in FIGS. 4*a-b*, provided on the front face of the nozzle changer 12, which forms the shielding element 27, is a brush element 23 (i.e. a brush), which in the same way as the shielding element 27 is moved along together with the nozzle changer 12 when the latter is moved from the rest position HP into the nozzle changing position WP and vice versa. As in the case of the example shown in FIGS. 2*a-b*, the brush element 23 serves for the cleaning of a nozzle 11 provided on the processing head 7 when the nozzle changer 12 is in the rest position RP. In the example shown in FIGS. 4*a-c*, the nozzle changer 12 at the rest position RP is protected by the housing 29 from slag and dust occurring during the cleaning.

Figure 5A:
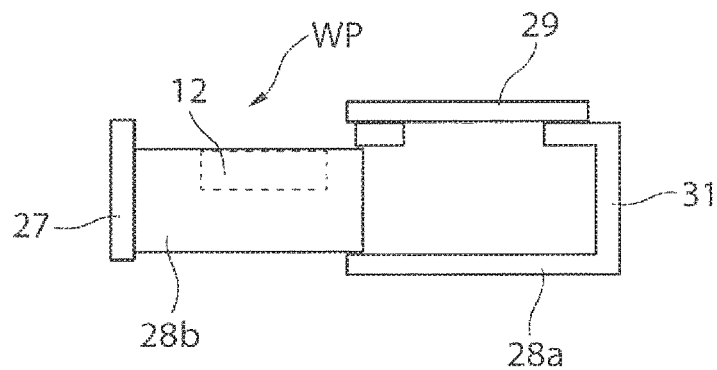
FIGS. 5a-c show schematic representations of the nozzle changer analogous to FIGS. 4a-c with a first and a second drawer-like component.
Figure 5B:
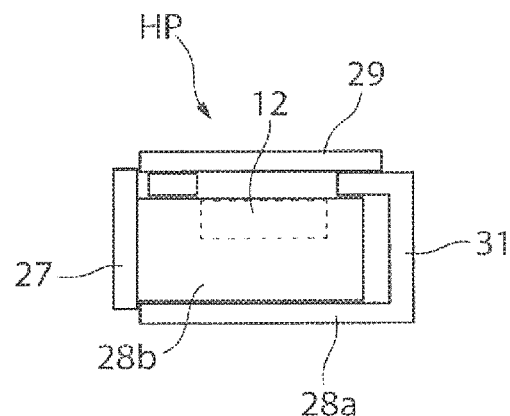
Figure 5C:
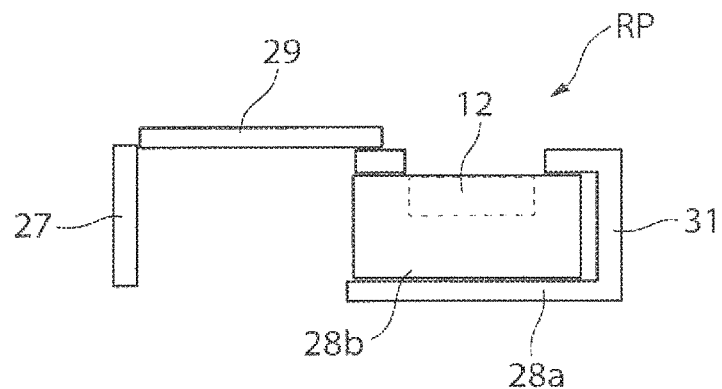

The arrangement of the drawer-like components 28*a*, 28*b* can also be seen well in FIGS. 5*a-c*, which, in a way analogous to FIGS. 4*a-c*, show the nozzle changer 12 schematically in the nozzle changing position WP, in the rest position HP and also in the setup position RP. It goes without saying that the arrangement of the two drawer-like components 28*a*, 28*b* in the rest position HP may also be chosen to be the other way around, i.e. the first drawer-like component 28*a* is accommodated in the second drawer-like component 28*b* or arranged in it.

In the case of the laser processing machines 1 described further above, the movement of the nozzle changer 12 into the setup position RP outside the protective enclosure 2, which is accessible for the operator 10, allows a pre-setup of nozzles 11, in that the nozzle holders 13 are suitably loaded with nozzles, to take place while other processes are taking place in the laser processing machine 1, for example the processing of the workpiece 2 by means of the laser beam 6 in the working space 8 or a change of the workpiece 3 to be processed.

What is claimed is:

1. A workpiece processing machine for processing a workpiece with a processing beam, the machine comprising:
   a nozzle changer for mounting nozzles to a processing head of the processing machine or for demounting nozzles from the processing head of the processing machine, the nozzle changer having a plurality of nozzle holders for holding nozzles; and
   a protective enclosure configured to close off a working space for the processing of the workpiece with the processing beam from a working space surrounding area;
   wherein the nozzle changer is movable between a nozzle changing position within the protective enclosure and a setup position outside the protective enclosure that is accessible for an operator, and the nozzle changer is also movable, in the protective enclosure, between the nozzle changing position and a rest position, and the nozzle changer is also movable between the rest position and the setup position; and
   wherein the nozzle changer is accommodated, in the rest position and the setup position, in a first drawer, and the first drawer is movable from the protective enclosure into the setup position, outside the protective enclosure, and the nozzle changer is accommodated, in the nozzle changing position, in a second drawer, the second drawer disposed within the first drawer in the rest position, the second drawer being moveable between the nozzle changing position and the rest position.

2. The processing machine of claim 1, further comprising: a housing for covering the plurality of nozzle holders of the nozzle changer in the rest position, and wherein a shield closes the housing when the nozzle changer is arranged in the rest position and in the setup position to inhibit laser radiation from exiting the working space into the working space surrounding area.

3. The processing machine of claim 1, further comprising: a nozzle magazine configured to deposit nozzles and arranged adjacent to the nozzle changer in the setup position.

4. The processing machine of claim 1, wherein the second drawer is connected to at least one shield configured to inhibit laser radiation from exiting the working space into the working space surrounding area, wherein the shield is decoupled from the second drawer when the first drawer is moved from the rest position into the setup position.

5. The processing machine of claim 1, further comprising: a drive operable to move the nozzle changer between the nozzle changing position and a rest position or between the nozzle changing position and the setup position.

6. The processing machine of claim 1, further comprising: a brush fixedly arranged in the working space and configured to clean a nozzle mounted on the processing head.

7. The processing machine of claim 4, further comprising:
   a brush fixedly arranged on the shield and configured to clean a nozzle mounted on the processing head.

8. The processing machine of claim 1, further comprising: a rotary drive operable to produce a rotary movement of at least one nozzle holder for mounting or demounting a nozzle from the processing head in the nozzle changing position of the nozzle changer.

9. The processing machine of claim 1, wherein the protective enclosure is a laser machining cabin.

* * * * *